United States Patent [19]

Yukuta et al.

[11] 4,246,361
[45] Jan. 20, 1981

[54] METHOD FOR PRODUCING FLAME- AND SMOKE-RESISTANT POLYURETHANE FOAM SHEET BY INCORPORATION OF A UREA DERIVATIVE IN REACTION MIXTURE

[75] Inventors: Toshio Yukuta, Kodaira; Takashi Ohashi, Iruma; Minoru Kojima, Tokyo; Masumi Saito, Tanashi, all of Japan

[73] Assignee: Bridgestone Tire Co., Ltd., Tokyo, Japan

[21] Appl. No.: 52,512

[22] Filed: Jun. 26, 1979

Related U.S. Application Data

[62] Division of Ser. No. 778,282, Mar. 16, 1977, Pat. No. 4,180,631.

[30] Foreign Application Priority Data

Mar. 17, 1976 [JP] Japan ................... 51-28948

[51] Int. Cl.³ .................. C08G 18/32; B29D 27/00
[52] U.S. Cl. .................... 521/128; 521/136; 521/158; 521/163; 521/164; 521/167; 521/903; 264/53; 264/54
[58] Field of Search ............... 521/136, 158, 163, 164, 521/167, 128; 264/53, 54

[56] References Cited

U.S. PATENT DOCUMENTS

| | | | |
|---|---|---|---|
| 2,892,216 | 6/1959 | Steel | 521/172 |
| 3,012,283 | 12/1961 | Foster | 521/174 |
| 3,079,641 | 3/1963 | Knox et al. | 521/167 |
| 3,277,027 | 10/1966 | Hennig et al. | 521/167 |
| 3,368,985 | 2/1968 | Wismer et al. | 521/164 |
| 3,420,787 | 1/1969 | Reymore et al. | 521/167 |
| 3,523,093 | 8/1970 | Stamberger | 521/163 |
| 3,632,531 | 1/1972 | Rush et al. | 521/170 |
| 3,663,500 | 5/1972 | Crabtree | 260/40 R |
| 3,859,351 | 1/1975 | Keller et al. | 156/331 |
| 3,954,899 | 5/1976 | Chang et al. | 521/159 |

*Primary Examiner*—Maurice J. Welsh
*Attorney, Agent, or Firm*—Sughrue, Rothwell, Mion, Zinn and Macpeak

[57] ABSTRACT

The flexible polyurethane foams having high flame resistance and smoke resistance can be produced by reacting a polyhydroxyl compound and a polyisocyanate with a urea derivative selected from the group consisting of (a) a compound represented by the general formula

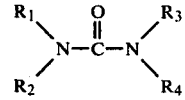

wherein at least one of $R_1$, $R_2$, $R_3$ and $R_4$ represents hydroxylalkyl, alkoxyalkyl, alkyl and aryl groups and the remainder represents hydrogen atom, and (b) a urea-formaldehyde condensation product in the presence of a catalyst, a surfactant and a blowing agent.

These polyurethane foams can easily provide the favorable foam sheets by compression-molding these foams under heating.

21 Claims, 2 Drawing Figures

METHOD FOR PRODUCING FLAME- AND SMOKE-RESISTANT POLYURETHANE FOAM SHEET BY INCORPORATION OF A UREA DERIVATIVE IN REACTION MIXTURE

This is a Division of application Ser. No. 778,282, filed Mar. 16, 1977, now U.S. Pat. No. 4,180,631 issued Dec. 25, 1979.

BACKGROUND OF THE INVENTION

1. Field of the Invention:

The present invention relates to flexible polyurethane foams having a high flame resistance and smoke resistance and to heat compression-moldings thereof.

2. Description of the Prior Art:

Polyurethane foams have a broad use from seat and cushion materials for furniture, vehicles and ships to cloths and architecture materials. Furthermore, it has been known that foam sheets can be obtained by compression-molding the polyurethane foam under heating by utilizing the thermoplasticity of flexible polyurethane foams and the foam sheets have been broadly used for both surface adhesive tapes; imitative leathers; packing cushion materials for protecting optical machines, precision machines and glass; a slip preventer for a mat; prevention of shock noise when a door is opened and closed; wrapping and the like.

Substantially all the above described materials are inflammable and in order to satisfactorily adapt the foam sheet to the above described uses, it has been recently demanded to use flame resistant polyurethane foams.

However, the well known processes, that is, use of phosphorus compounds, a combined use of halogen and phosphorus compounds, use of a metal oxide, such as antimony oxide, use of a reactive flame retardant and the like can give a certain degree of flame resistance to polyurethane foams but the generation of smoke when burning is rather larger than the case where no flame retardant is used and there has been a great problem in view of the smoke emission.

Moreover, the process heretofore carried out for molding the foam into a sheet comprises compressing a flexible polyurethane foam at a high temperature 150°–200° C. for a long time and this process has not been preferable in view of save of energy and productivity.

SUMMARY OF THE INVENTION

An object of the present invention is to provide flexible polyurethane foams having a high flame resistance and smoke resistance.

Another object of the present invention is to provide polyurethane foam sheets having a high flame resistance and smoke resistance.

The other object of the present invention is to provide a method for producing said polyurethane foam sheet.

One aspect of the present invention is production of flexible polyurethane foams having a high flame resistance and smoke resistance by reacting a polyhydroxyl compound and polyisocyanate with a urea derivative selected from the group consisting of

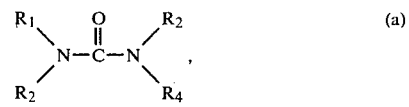

wherein at least one of $R_1$, $R_2$, $R_3$ and $R_4$ represents hydroxyl group, alkoxyalkyl group, alkyl group or aryl group and the remainder represents hydrogen and (b) urea-formaldehyde condensation product, in the presence of a catalyst, a surfactant and a blowing agent.

Another aspect of the present invention is production of polyurethane foam sheets having a high flame resistance and smoke resistance by reacting a polyhydroxyl compound and polyisocyanate with a urea derivative selected from the group consisting of

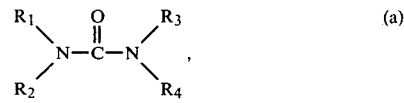

wherein at least one of $R_1$, $R_2$, $R_3$ and $R_4$ represents hydroxyl group, alkoxyalkyl group, alkyl group or aryl group and the remainder represents hydrogen (b) urea-formaldehyde condensation product, in the presence of a catalyst, a surfactant and a blowing agent to form a foam and then compressing the resulting foam under heating. Hitherto, it has been known that a flame resistant polyurethane foam is produced by using urea but this process has the following various drawbacks and the resulting polyurethane foams have not been fully satisfied in view of the physical properties and the flame resistance. That is, (1) the foam is high in density, (2) the compressive permanent stress increases and (3) the flame resistance lowers when the foam is left to stand under moisture and as time passes.

According to the present invention, polyurethane foams having a high flame resistance can be produced by using an inexpensive urea derivative without using any flame retardant, so that the present invention is economic.

Furthermore, the polyurethane foams according to the present invention are not only excellent in flame resistance but also that smoke emission is restrained, so that the foams are further preferable in view of safety upon burning.

In addition, according to the present invention, the polyurethane foam sheets can be easily obtained by compressing the polyurethane foams at a temperature of 80°–120° C., so that the foam sheets are preferable in view of saving of energy and productivity. The production of the compression-moldings from usual polyurethane foams under such conditions is difficult.

Accordingly, the polyurethane foams obtained according to the present invention are useful for various cushion materials, interior materials, heat insulation materials, and the polyurethane foam sheets are useful for both surface adhesive tapes, imitative leathers, packing, cushion materials and the like.

DESCRIPTION OF THE PREFERRED EMBODIMENT

Figure 1:
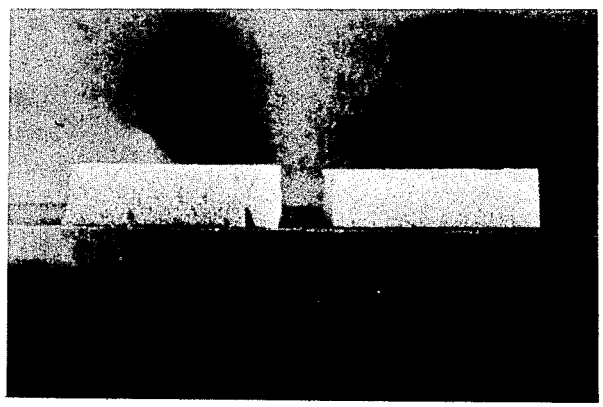
FIG. 1 is a photograph showing the shapes of polyurethane foam according to the present invention (left side) and polyurethane foam which is not in accordance with the present invention (right side) prior to compression under heating and FIG. 2 is a photograph showing the shapes of the polyurethane foams shown in FIG. 1 after compressing under heating.

The polyhydroxyl compounds to be used in the present invention are polyethers or polyesters having a terminal hydroxyl group which are usually referred to as polyols. The polyether polyols are usually obtained by ring opening addition polymerization of alkylene oxides, such as ethylene oxide, propylene oxide and the like, with initiators containing active hydrogen atoms, such as glycerine, trimethylolpropane, pentaerythritol, sorbitol, saccharose and the like, in the presence of an alkali catalyst. The polyester polyols are usually obtained by the polycondensation reaction of dicarboxylic acids, such as adipic acid, sebasic acid, phthalic acid, isophthalic acid, terephthalic acid and the like, with initiators containing active hydrogen, such as ethylene glycol, propylene glycol, diethylene glycol, glycerine, trimethylol ethane, trimethylol propane and the like.

In the present invention, the polyhydroxyl compounds having a number average molecular weight of 3,000–6,000 and containing at most 70 mole % of primary hydroxyl group in its molecule terminal are generally used.

Among the polyhydroxyl compounds as described above, there may be preferably used polyether polyols. Especially, poly(oxypropylene)triol obtained by reacting glycerine with propylene oxide is advantageously used.

As the polyisocyanates to be used in the present invention, use may be generally made of tolylene diisocyanate. Particularly, tolylene diisocyanate, wherein 2,4- and 2,6-isomers of isocyanate group are mixed in a mixture ratio of 80/20 or 65/35 (weight ratio), is preferable in view of a low cost and utility. Tolylene diisocyanate may be pure product, crude product or the mixture thereof. As the other polyisocyanates, use may be made of diphenyl diisocyanate, chlorophenyl-2,4-diisocyanate, p-phenylene diisocyanate, xylylene diisocyanate, polymethylene-polyphenyl isocyanate and the like, or the mixtures of these polyisocyanates with tolylene diisocyanate.

The amount of polyisocyanate used based on the total amount of the polyol and the other compound having active hydrogen atoms, that is, the isocyanate index (NCO index) is in the range of 80–130, but when considering the balance of the flame resistance and the smoke resistance to the general physical properties of the produced polyurethane foam, the isocyanate index is preferred to be within the range of 100–110.

The urea derivatives to be used in the present invention are selected from the following compounds.
(a) Compounds represented by the general formula

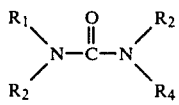

wherein at least one of $R_1$, $R_2$, $R_3$ and $R_4$ represents a hydroxyalkyl-, alkoxyalkyl-, alkyl- or aryl group and the remainder represent hydrogen atoms; and
(b) Urea-formaldehyde condensation product.

As the compounds represented by the general formula (a), mention may be made of hydroxylalkyl substituted urea compounds, such as N-methylol urea, N,N'-dimethylol urea, N,N,N'-trimethylol urea, N,N,N',N,'-tetramethylol urea, N-ethylol urea, N,N'-diethylol urea, N,N-di($\beta$-hydroxyethyl) urea; alkoxyalkyl substituted urea compounds, such as N,N'-dimethoxymethyl urea, N,N'-dimethoxyethyl urea, N,N'-diethoxymethyl urea, N,N'-diethoxyethyl urea; alkyl substituted urea compounds, such as N-methyl urea, N,N'-dimethyl urea, N-ethyl urea, N,N'-diethyl urea; and aryl substituted urea compounds, such as N-phenyl urea, N,N'-diphenyl urea.

As the urea-formaldehyde condensation products (b), the compound prepared by reacting one mole of urea with 1–4 moles of formadehyde in the presence of an alkali catalyst, and commercially available various urea-formaldehyde condensation products may be used.

In the present invention, as the urea derivative, there is preferably used N,N'-dimethylol urea, N,N'-dimethoxymethyl urea, N,N'-dimethyl urea and a urea-formaldehyde condensation product. Particularly, N,N'-dimethylol urea is preferred for production of polyurethane foam sheets having an excellent flame resistance.

The amount of the urea derivative to be used in the present invention must be within the range of 2–50 parts by weight based on 100 parts by weight of the polyhydroxyl compounds. The use of less than 2 parts by weight of the urea derivative can not provide a sufficient flame resistance to the resultant polyurethane foam, and when the amount of the urea derivative is more than 50 parts by weight, a favorable foam can not be obtained. Especially, the amount of said urea derivative to be used is the most favorable in the range of 5 to 20 parts by weight by considering the balance of the foaming reaction and the process of compression-molding.

In the present invention, as a curing catalyst for said urea derivative, use may be made of ammonium hydrogen-phosphate, ammonium nitrate, ammonium formate, hydrogen chloride salts of alkyl amines (alkyl means methyl, ethyl, propyl and the like), magnesium chloride and the like. The amount of said catalyst is within the range of 0.5–3 parts by weight based on 100 parts by weight of the polyhydroxyl compound.

As the catalyst to be used in the present invention, use may be made of already known catalysts which have been commonly used in this field. The catalysts include organometallic compounds, such as stannous octoate, dibutyltin dilaurate and the like; and amines, such as triethylenediamine, triethylamine, N-methylmorpholine, N-ethylmorpholine, tetramethylbutanediamine, pentamethyldiethylenetriamine, N,N-dimethylethanolamine, bis($\beta$-dimethylaminoethyl) ether and the like. The above described catalysts can be used alone or in admixture. The amount of catalyst to be used in the present invention is not particularly limited and can be varied in a wide range. However, the catalyst is generally used in an amount of 0.01–5.0 parts by weight, preferably 0.01–2.0 parts by weight, based on 100 parts by weight of the polyhydroxyl compound used in the production of the polyurethane.

As the surfactant, use may be made of well known silicone surfactants, for example, polydialkylsiloxanes and polysiloxane-polyoxyalkylene block copolymers. The kind and use amount of the silicone surfactant are not limited as far as the object of the present invention is attained, but it is preferable to use polysiloxane-polyoxyalkylene block copolymer alone or in admixture. The use amount of silicone surfactant is 1.0–5.0 parts by weight, preferably 1.0–2.0 parts by weight, based on 100 parts by weight of the polyhydroxyl compound.

The blowing agent to be used in the present invention is water or volatile liquid having a low boiling point. The volatile liquid having a low boiling point includes, for example, trichloromonofluoromethane dibromodifluoromethane, dichlorodifluoromethane, dichlorotetrafluoroethane, monochlorodifluoromethane, trifluoroethylbromide, dichloromethane and the like. These blowing agents may be used alone or in admixture.

The polyurethane foam obtained in the present invention is a flexible polyurethane foam having a density within the range of 20–50 kg/m$^3$. If desired, the density of the foam can be further controlled by adding water, another blowing agent or a urea derivative or by selecting the kind of the polyhydroxyl compound or the polyisocyanate. Further, in the present invention, a crosslinking agent, a flame retardant, pigment and the like may be added in addition to the above described components.

The production of the polyurethane foams according to the present invention can be carried out by conventionally known process. For example, an one shot process, wherein the polyhydroxyl compound, the urea derivative, water, the catalyst and the surfactant are concurrently mixed together with the polyisocyanate to cause reaction and foaming, is usually adopted. The polyurethane foam obtained as described above in the present invention has a high flame resistance and smoke resistance.

In the present invention, in order to produce a polyurethane foam sheet, it is necessary to compress the polyurethane foam obtained above under restricted condition which are determined considering heating temperature, compression degree, compressive stress and heat-compressing time.

The desired polyurethane foam sheet of the present invention, can be easily produced by compressing the polyurethane foam obtained above under the conditions of a pressure of 5–200 kg/cm$^2$ and a temperature of 80°–120° C. for 2–10 minutes. For example, a polyurethane foam sheet having a thickness of 2 mm is obtained by putting the polyurethane foam having a thickness of 20 mm obtained in the present invention into a mold having a depth of 2 mm and by compressing said foam under the conditions of a temperature of 100° C. and a pressure of 100 kg/cm$^2$ for 10 minutes. On the other hand, a general flexible polyurethane foam is not at all compression-molded under such conditions.

The following examples are given for the purpose of illustration of this invention and are not intended as limitations thereof. In the examples, "parts" means by weight unless otherwise indicated.

In the examples, the burning test was carried out according to ASTM D-1692-59T. The smoke emission test was carried out in the following manner. One g of a sample foam is burnt in an electrical furnace having an inner diameter of 100 mm and a depth of 250 mm by means of an electrical heating wire of 3 KW while flowing air thereover at a rate of 2.0 l/min, and the generated smoke is gathered in a box of 50×50×50 cm. The maximum value of the extinction coefficient per unit weight of the sample is measured by means of a photoelectric detector, and expressed as the smoke generation coefficient $C_{Smax}$(m$^{-1}$). The smoke resistance of a foam was judged by the smoke generation coefficient. The smaller the coefficient, the higher the smoke resistance is.

EXAMPLE 1

Ten parts of N,N'-dimethylol urea was previously dispersed in 100 parts of poly(oxypropylene) triol (made by SANYŌ Chemical Industries, Ltd. trademark. GP-3000; number average molecular weight: about 3000, hydroxyl value: 56) and 4.2 parts of water, 0.2 part of stannous octoate, 0.1 part of triethylenediamine and 1.7 parts of silicone surfactant (trademark: SH-190, made by Toray Silicone Co.) were added thereto. The mixture was thoroughly mixed and stirred by means of a propeller stirrer for about 30 seconds. 53.2 parts of tolylene diisocyanate (2,4-isomer: 2,6-isomer=80:20) was added to the resulting homogeneous mixture. When the obtained mixture was stirred at a high speed, the reaction mixture reached a creamy state in about 18 seconds. Then, the reaction mixture was rapidly poured into a paper mold, foaming began and foam rising was completed after about 119 seconds and so-called healthy bubbles were observed.

The said polyurethane foam was put in an oven at 120° C. and after-cured for 20 minutes, after which the physical properties were measured after one week. The density of the foam was 23.5 kg/m$^3$ and the foam had a self-extingushing property (burning extent: 6.1 cm, burning time: 18 seconds) in the burning test of ASTM D-1692-59T. In the smoke emission test, $C_{Smax}$ was 0.75 m$^{-1}$, while $C_{Smax}$ of a commercially available polyurethane foam under the same measuring condition was 0.87 m$^{-1}$ and the $C_{Smax}$ of an ordinarily used flame resistant polyurethane foam having added thereto 25 parts of tris-(2,3-dichloropropyl) phosphate was 1.03 m$^{-1}$. As seen from these data, the smoke resistance of the polyurethane foam of the present invention was very much higher than that of the comparative polyurethane foams.

EXAMPLE 2

Using the same starting materials and operations as described in Example 1, 20 parts of N,N'-dimethylol urea was added to obtain a foam.

The obtained flexible polyurethane foam had a self-extinguishing property (burning extent: 9.2 cm, burning time: 35 seconds) in the burning test of ASTM D-1692-59T. The smoke generation coefficient $C_{Smax}$ was 0.66 m$^{-1}$ which was far lower than the (1.03 m$^{-1}$) of the ordinarily used flame resistant polyurethane foam. The polyurethane foam of the present invention is thus seen to have high smoke resistance.

EXAMPLE 3

Using the same starting materials and operations as described in Example 1, foaming was effected by adding 10 parts urea-formaldehyde condensation product which had become insoluble in water by reacting urea with formaldehyde in a molar ratio of 1:2 and then somewhat advancing the polycondensation.

The obtained flexible polyurethane foam had a self-extingushing property (burning extent: 9.9 cm, burning time: 54 seconds). The smoke generation coefficient $C_{Smax}$ was 0.76 m$^{-1}$ and was lower than the value (1.03 m$^{-1}$) of the ordinarily used polyurethane foam. Thus the polyurethane foam in this example was very high in smoke resistance.

COMPARATIVE EXAMPLE 1

Using the same starting materials and operations as described in Example 1, foaming was effected except for the use of 10 parts of urea instead of N,N'-dimethylol urea condensation product in Example 1. The obtained flexible polyurethane foam had a density of 25.3 kg/m$^3$ and was inflammable in the burning test of ASTM D-1692-59T.

EXAMPLE 4

The polyurethane foam obtained in Example 1, which had not yet been after-cured, was cut to a thickness of 2 cm and put in a mold having a depth of 2 mm, which had previously been heated at 100° C. and compression-molded by applying a pressure of 100 kg/cm$^2$ by means of an electric heating press set at 100° C. for 10 minutes, to obtain a foam sheet having a thickness of 2 mm. This foam sheet had a tensile strength of 11.6 kg/cm$^2$ and an elongation of 115%.

COMPARATIVE EXAMPLE 2

Foaming was effected using the same composition as described in Example 1 except that N,N'-dimethylol urea was not used.

The foam obtained in a cream time of 18 seconds and a rise time of 92 seconds had a density of 28.9 kg/m$^3$. This foam was cut to a thickness of 2 cm and when this cut foam was compression-molded at 100° C. for 10 minutes in the same manner as described Example 4 and taken out from the mold, foam returned to the original foam shape and the compression molding was not possible.

FIG. 1 shows the foams prior to the compression-molding of the above described Example 4 and Comparative Example 2, which were cut to a thickness of 2 cm. The left side and the right side in FIG. 1 show the foams in Example 4 and Comparative Example 2 respectively.

Figure 2:
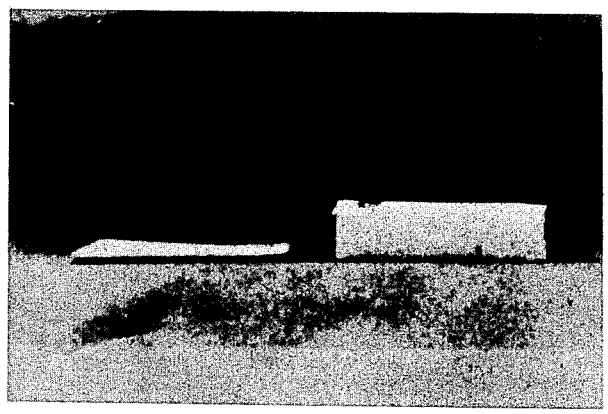

These foams were put in the molds having depth of 2 mm and heated at 100° C. as described above and compression-molded under heating under a pressure of 100 kg/cm$^2$ for 10 minutes. The obtained results are shown in FIG. 2. The foam in Example 4 was molded into a sheet having a thickness of 2 mm and the shape was maintained (left side foam), while when the foam in Comparative Example 2 was taken out from (right side foam).

As seen from these photographs, it has been found that the flexible polyurethane foam according to the present invention has the heat compression-molding ability which has never been possessed by the conventional foam.

EXAMPLE 5

The foaming was effected in the same process and operation as described in Example 1 except that 10 parts of N,N'-dimethoxymethyl urea (made by Mitusi Toatsu Chemicals Inc. trademark: Uramine T-101) instead of N,N'-dimethylol urea and 3 parts of diammonium hydrogenphosphate as a latent acid catalyst were used. The polyurethane foam obtained in the cream time of 25 seconds and the rise time of 180 seconds had a density of 26.7 kg/m$^3$. This foam was cut into 2 cm and the cut foam was molded at 100° C. for 10 minutes in the same manner as described in Example 4 to obtain a foam sheet having a thickness of 2.0 mm. This foam sheet had a tensile strength of 6.96 kg/cm$^2$ and an elongation of 230%. Furthermore, the obtained polyurethane foam sheet had the self-extinguishing property in the burning test of ASTM D-1692-59T.

EXAMPLE 6

The foaming was effected in the same process and operation as described in Example 1 except that 10 parts of commercially available urea-formaldehyde condensation product (made by DAIWA Chemical Co., Ltd. trade mark: UMT-G) was added as the urea derivative. The foam obtained in the cream time of 20 seconds and the rise time of 129 seconds had a density of 23.5 kg/m$^3$. This foam was cut into a thickness of 2 cm and the cut foam was molded at 100° C. for 10 minutes in the same manner as described in Example 4 to obtain a foam sheet having a thickness of 2.0 mm. This foam sheet had a tensile strength of 5.17 kg/cm$^2$ and an elongation of 135%.

The obtained polyurethane foam sheet had the self-extinguishing property in the burning test of ASTM D-1692-59T.

EXAMPLE 7

The foaming was effected in the same process and operation as described in Example 1 except that 10 parts of N,N-di($\beta$-hydroxyethyl) urea was used instead of N,N'-dimethylol urea. The polyurethane foam obtained in the cream time of 25 seconds and the rise time of 180 seconds had a density of 27.5 kg/m$^3$. This foam was cut into a thickness of 2 cm and the cut foam was molded at 100° C. for 10 minutes in the same manner as described in Example 4 to obtain a foam sheet having a thickness of 2.0 mm. This foam sheet had a tensile strength of 6.31 kg/cm$^2$ and an elongation of 125%.

The obtained polyurethane foam sheet had the self-extinguishing property in the burning test of ASTM D-1692-59T.

EXAMPLE 8

The foaming was effected in the same process and operation as described in Example 1 except that 10 parts of N,N'-dimethyl urea was added instead of N,N'-dimethylol urea. The foam obtained in the cream time of 17 seconds and the rise time of 103 seconds had a density of 24.1 kg/m$^3$. This foam was cut into a thickness of 2 cm and the cut foam was molded at 100° C. for 10 minutes in the same manner as described in Example 4 to obtain a foam sheet having a thickness of 2.0 mm. This foam sheet had a tensile strength of 2.17 kg/cm$^2$ and an elongation of 160%.

The obtained polyurethane foam sheet had the self-extinguishing property in the burning test of ASTM D-1692-59T.

What is claimed is:

1. A method of producing a flame- and smoke-resistant flexible polyurethane foam sheet which comprises (1) reacting a system consisting essentially of a polyhydroxyl compound and a polyisocyanate with a urea derivative selected from the group consisting of a. a compound represented by the general formula

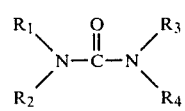

wherein at least one of $R_1$, $R_2$, $R_3$, and $R_4$ represents a member selected from the class consisting of a hydroxyalkyl group, an alkoxyalkyl group, an alkyl group and an aryl group and wherein any of $R_1$, $R_2$, $R_3$ and $R_4$ which does not represent a member from said class represents a hydrogen atom; and b. a urea-formaldehyde condensation product prepared by reacting 1 mole of urea with 1 to 4 moles of formaldehyde in the presence of an alkali catalyst, said reacting with a. or b. being in the presence of a catalyst for the production of the polyurethane foam, a surfactant and a blowing agent, wherein the polyisocyanate is used in an amount corresponding to an isocyanate index of 80–130 and the urea derivative is used in an amount of 2–5 parts by weight based on 100 parts by weight of the polyhydroxyl compound; and c. compressing the polyurethane foam obtained in step (1) for 2–10 minutes at a temperature of 80°–120° C. and a pressure of 5–200 kg/cm$^2$ to obtain said flexible polyurethane foam sheet.

2. The method of claim 1, wherein the polyhydroxyl compound has a number average molecular weight of 3,000 to 6,000 and contains at most 70 mole % of primary hydroxyl groups in its terminal group.

3. The process of claim 1, wherein the polyhydroxyl compound has a number average molecular weight of 3,000 to 6,000 and contains at most 70 mole % of primary hydroxyl groups at its terminals.

4. The process as claimed in claim 3, wherein the polyhydroxyl compound is selected from the group consisting of a polyether polyol and a polyester polyol.

5. The process as claimed in claim 4, wherein the polyhydroxyl compound is a polyether polyol.

6. The process as claimed in claim 5, wherein the polyether polyol in poly(oxypropylene) triol.

7. The process as claimed in claim 1, wherein the polyisocyanate is selected from the group consisting of tolylene diisocyanate, diphenylmethane diisocyanate, diphenyl diisocyanate, chlorophenyl-2,4-diisocyanate, p-phenylene diisocyanate, xylylene diisocyanate and polymethylene-polyphenyl isocyanate.

8. The process as claimed in claim 1, wherein the polyisocyanate is tolylene diisocyanate.

9. The process as claimed in claim 1, wherein the polyisocyanate used has an isocyanate index of 80–130.

10. The process as claimed in claim 1, wherein the urea derivative is a hydroxyalkyl substituted urea compound.

11. The process as claimed in claim 10, wherein the hydroxyalkyl substituted urea compound is selected from the group consisting of N-methylol urea, N,N'-dimethylol urea, N,N,N'-trimethylol urea, N,N,N',N'-tetramethylol urea, N'N'-diethylol urea and N,N-di($\beta$-hydroxyethyl) urea.

12. The process as claimed in claim 11, wherein the hydroxyalkyl substituted urea compound is N,N'-dimethylol urea.

13. The process as claimed in claim 1, wherein the urea derivative is an alkoxyalkyl substituted urea compound.

14. The process as claimed in claim 13, wherein the alkoxyalkyl substituted urea compound is selected from the group consisting of N,N'-dimethoxymethyl urea, N,N'-dimethoxyethyl urea, N,N'-diethoxymethyl urea, and N,N'-diethoxyethyl urea.

15. The process as claimed in claim 14, wherein the alkoxyalkyl substituted urea compound is N,N'-dimethoxymethyl urea.

16. The process as claimed in claim 1, wherein the urea derivative is an alkyl substituted urea compound.

17. The process as claimed in claim 16, wherein the alkyl substituted urea compound is selected from the group consisting of N-methyl urea, N,N'-dimethyl urea, N-ethyl urea and N,N'-diethyl urea.

18. The process as claimed in claim 17, wherein the alkyl substituted urea compound is N,N'-dimethyl urea.

19. The process as claimed in claim 1, wherein the urea derivative is an aryl substituted urea compound.

20. The process as claimed in claim 19, wherein the aryl substituted urea compound is selected from the group consisting of N-phenyl urea and N,N'-diphenyl urea.

21. The process as claimed in claim 1, wherein the amount of the urea derivative is 5–20 parts by weight per 100 parts by weight of the polyhydroxyl compound.

* * * * *